(12) United States Patent
Coman

(10) Patent No.: US 6,438,619 B1
(45) Date of Patent: Aug. 20, 2002

(54) OPERATING SYSTEM BASED REMOTE COMMUNICATION SYSTEM

(75) Inventor: James S. Coman, Buffalo Grove, IL (US)

(73) Assignee: Gage Brook L.L.C., Barrington, IL (US)

( * ) Notice: Subject to any disclaimer, the term of this patent is extended or adjusted under 35 U.S.C. 154(b) by 0 days.

(21) Appl. No.: 08/868,109

(22) Filed: Jun. 3, 1997

Related U.S. Application Data

(63) Continuation of application No. 08/388,213, filed on Feb. 13, 1995, now abandoned.

(51) Int. Cl.$^7$ .............................................. G06F 15/163

(52) U.S. Cl. ....................... 709/319; 709/313; 709/203; 345/672; 717/147

(58) Field of Search .......................... 345/68, 683, 684, 345/672; 709/319, 313, 203; 717/147

(56) References Cited

U.S. PATENT DOCUMENTS

| | | | |
|---|---|---|---|
| 4,125,873 A | 11/1978 | Chesarek | 345/555 |
| 4,204,206 A | 5/1980 | Bakula et al. | 345/635 |
| 4,315,310 A | 2/1982 | Bayliss et al. | 710/3 |
| 4,644,472 A | * 2/1987 | Montgomery | 709/319 |

(List continued on next page.)

FOREIGN PATENT DOCUMENTS

| | | | | |
|---|---|---|---|---|
| EP | 0 409 588 A2 | 1/1991 | | G06F/3/033 |
| EP | 0 477 124 A1 | 3/1992 | | G06F/3/14 |
| EP | 0 726 519 A1 | * 8/1996 | | G05F/9/455 |
| WO | WO 91/02313 | 2/1991 | | G06F/15/16 |

OTHER PUBLICATIONS

IBM Technical Disclosure Bulletin / vol. 34 / No. 7B / pp. 38–39 / Dec. 1991 "Rendering Graphical User Interface Constructs in Terminal Emulator".

IBM Technical Disclosure Bulletin vol. 37 / No. 08 / p. 533 / Aug. 1994 "Using Mainframe Host Panel Source to Produce Graphic User Interface Panel Dynamically".

Andrew Davidson, "Coding with HTML Forms," *Dr. Dobb's Journal*, Jun. 1995, pp. 70–75, 106–108.

Michael Erwin, "Publishing on the Web: Part II," *Boardwatch*, Mar. 1995, pp. 44–47.

MediaHost Manual, pp. 1–4, 161–189.

MediaHost Professional Connecting Software brochures, copyright 1994, 11 pages total.

Carr, James, "PowerBBS for Windows 4.0 User's Guide," 1989–1995.

"A Report on Worldgroup (a.k.a. 'Project Victor') for Sysops of the Major BBS," Galacticomm, Inc., 1995.

Andrew Davison, "Coding With HTML Forms," *Dr. Dobb's Journal*, Jun. 1995, pp. 70–75, 106–108.

Michael Erwin, "Publishing On the Web: Part I," *Boardwatch*, Feb. 1995, pp. 45–49.

*Primary Examiner*—St. John Courtnay, III
*Assistant Examiner*—Lewis A. Bullock, Jr.
(74) *Attorney, Agent, or Firm*—Leydig, Voit & Mayer, Ltd.

(57) ABSTRACT

A remote communication system provides a fast, efficient and user-friendly interface which does not suffer from the inefficiencies of the data transfer bottlenecks inherent in the prior art devices and methods. An operating system based remote communication system is achieved by providing a remote computer with a small, relatively simple terminal program which receives and interprets both data and command instructions from the host system. The present invention employs commands which are based on fundamental tasks that the operating system of the remote system may understand and implement, such as creating windows, buttons, edit fields, listboxes and other operating system objects.

11 Claims, 11 Drawing Sheets

U.S. PATENT DOCUMENTS

| | | | |
|---|---|---|---|
| 4,665,501 A | 5/1987 | Saldin et al. | 710/8 |
| 4,899,136 A | 2/1990 | Beard et al. | 345/156 |
| 4,903,218 A * | 2/1990 | Longo et al. | 345/759 |
| 4,972,368 A * | 11/1990 | O'Brien et al. | 710/67 |
| 5,043,919 A | 8/1991 | Callaway et al. | 345/733 |
| 5,050,104 A | 9/1991 | Hayen et al. | 345/556 |
| 5,162,986 A | 11/1992 | Graber et al. | 700/17 |
| 5,175,813 A | 12/1992 | Golding et al. | 345/786 |
| 5,206,934 A * | 4/1993 | Naef, III | 709/204 |
| 5,214,756 A | 5/1993 | Franklin et al. | 345/839 |
| 5,367,667 A * | 11/1994 | Whalquist et al. | 714/32 |
| 5,410,681 A * | 4/1995 | Jessen | 703/27 |
| 5,421,009 A * | 5/1995 | Platt | 709/221 |
| 5,428,782 A * | 6/1995 | White | 709/101 |
| 5,461,716 A * | 10/1995 | Eagen et al. | 345/733 |
| 5,471,615 A * | 11/1995 | Amatsu et al. | 709/202 |
| 5,583,761 A * | 12/1996 | Chou | 707/536 |
| 5,640,556 A * | 6/1997 | Tamura | 707/10 |
| 5,754,795 A * | 5/1998 | Kuhlman et al. | 709/236 |
| 5,831,609 A * | 11/1998 | London et al. | 345/746 |

\* cited by examiner

HOST to TERMINAL Commands

| Command Name | Command | Extension | Parameters (Length) | Description |
|---|---|---|---|---|
| Create Dialog Box or Window | W | C | Dialog Number (BYTE)<br>Dialog Parent (BYTE)<br>Dialog ID (DWORD)<br>Dialog Version (BYTE) | Instruction for terminal program to display the specified dialog box or window on the display. |
| Destroy Dialog Box or Window | W | D | Dialog Number (BYTE) | Instruction for terminal program to destroy the specified dialog box or window. |
| Pop Up Message Box | M | — | Dialog Parent (BYTE)<br>Dialog Style (WORD)<br>Title Length (BYTE)<br>Message Length (WORD)<br>Title Text (String) follows CRC8<br>Message Text (string) follows Title Text | Instruction for terminal program to pop up a dialog box with the specific characteristics |
| Begin Drawing | B | — | Dialog Number (BYTE) | Instruction for terminal program to accept drawing commands for the specified dialog box or window. |
| Get Dialog Box Text. | C | G | Dialog Number (BYTE)<br>Control ID (WORD)<br>Maximum Characters (WORD) | Request for terminal program to send text of a dialog box control. |
| Set Dialog Box Text | C | T | Dialog Number (BYTE)<br>Control ID (WORD)<br>Number of Characters (WORD)<br>Control Text (string) follows CRC8 | Request for terminal program to set text of a dialog box control. |

FIG. 3B

HOST to TERMINAL Commands (continued)

| Command Name | Command | Extension | Parameters (Length) | Description |
|---|---|---|---|---|
| Add Item to List | L | A | Dialog Number (BYTE)<br>Control ID (WORD)<br>Item Length (BYTE)<br>Item Number (DWORD)<br>Item Text (string) follows CRC8 | Request for terminal program to add an item to the specified listbox. Can also be used to replace a listbox spacer. |
| Fill List | L | F | Dialog Number BYTE)<br>Control ID (WORD)<br>List Version (BYTE)<br>List ID (DWORD) | Request for terminal program to fill a specified list or combo-box with a specified list. |
| Initialize List | L | I | Dialog Number (BYTE)<br>Control ID (WORD)<br>Number of Items (DWORD) | Request for terminal program to fill a specified listbox with spacers that will be replaced later by strings. |
| Set Top Index | L | N | Dialog Number (BYTE)<br>Control ID (WORD)<br>Index (DWORD) | Request for terminal program to scrolls a specified listbox so that the listbox item specified by the index number appears at the top of the listbox. |
| Select Item | L | S | Dialog Number (BYTE)<br>Control ID (WORD)<br>Index (DWORD) | Request for terminal program to select an item specified by the index number in the specified listbox. |

FIG. 3C

TERMINAL to HOST Commands

| Command Name | Command | Extension | Parameters (Length) | Description |
|---|---|---|---|---|
| Dialog Box Created | ASCII 16 | — | Dialog Number (BYTE) | Message confirming the successful creation of a dialog box. |
| Control Clicked | ASCII 128 | — | Dialog Number (BYTE) Control ID (WORD) | Message notifying host that a button has been clicked by the user of the terminal program. |
| Dialog Box String | C | T | Dialog Number (BYTE) Control ID (WORD) Number of characters (WORD) Control Text (string) follows CRC8 | Message sending a dialog box string. |
| Request for Listbox Items | L | R | Dialog Number (BYTE) Control ID (WORD) Number of Items (BYTE) First Item (DWORD) | A request by the terminal program to replace spacers in a listbox with listbox strings. |
| Request for List Resource | R | L | List ID (DWORD) | A request by the terminal program for a list resource file. |
| Request for Metafile Resource | R | M | Metafile ID (DWORD) | A request by the terminal program for a Metafile resource file. |
| Request for Window (Dialog) Resource | R | W | Dialog ID (DWORD) | A request by the terminal program for a dialog resource file. |

FIG. 3D

OPERATING SYSTEM BASED REMOTE COMMUNICATION SYSTEM

This is a continuation of application(s) Ser. No. 08/388,213 filed on Feb. 13, 1995, now abandoned.

FIELD OF THE INVENTION

The present invention relates to the field of remote communication systems, and more particularly to a remote system which interfaces with one or more host systems by receiving and interpreting advanced operating system based command instructions from a host system and executing the instructions on the remote system using the operating system instruction set of the remote system.

BACKGROUND OF THE INVENTION

Remote terminals are commonly used to communicate with host computer systems. Such terminals provide users at remote locations with access to the programs, databases and other resources of the host system. The communication between remote terminal and host system typically occurs via telephone lines or other serial or parallel communication lines. A strict communication protocol is required to send and receive data or other information to and from the host system.

Traditionally, a terminal comprised a dedicated hardware device which was capable of sending information to a host system and receiving and displaying information received from the host system. The teletype machine is one early example of a dedicated hardware terminal. The teletype machine is capable of interpreting a stream of data characters from a host system and printing the results of its interpretation on fan fold paper for the user to view. Users of teletype machines are also able to send messages or requests to the host system by typing on the teletype machine's keyboard.

An improvement to the basic teletype machine is a cathode ray tube (CRT) terminal. Early character based CRT terminals communicate with host systems in much the same way as the older teletype machines. However, instead of printing information received from the host system on fan fold paper, the information is displayed on the CRT screen. Displaying the information on the screen enhances the user interface of the terminal. Character based terminals communicate by interpreting a stream of alphanumeric and control characters sent by the host system. Alphanumeric characters sent by the host system are displayed on the screen of the remote terminal while control characters are used to control the location of the terminal cursor, thereby controlling the location of the alphanumeric characters to be displayed.

The character based CRT terminals, while an improvement over the basic teletype machines, have certain drawbacks and deficiencies. Specifically, the user interfaces of character based terminals are severely limited due to the main bottleneck of remote communication—namely, transfer speed. Since only a limited amount of data may be sent via the communication lines to the remote terminal at any given time, it is often necessary to provide the user at the remote terminal with short, cryptic command line prompts rather than more elaborate full text prompt screens, thereby reducing the data transfer bottleneck of the system. As a result, either system speed or user friendliness suffers measurably.

Another type of terminal which uses a CRT display is a graphics based terminal. In addition to displaying alphanumerical characters, graphics based terminals are capable of interpreting commands from the host computer to draw lines, boxes, circles, stylized text, and certain graphical characters on the graphics display of the terminal. In this way, the user-friendliness of the interface may be improved over character based terminals. However, graphics based terminals are typically more expensive than character based terminals and offer improvements in the user friendliness of the interface only at the sacrifice of system speed.

With the explosion in the popularity of the personal computer, a large market arose for the development of terminal emulators. A terminal emulator typically has a small software program which allows a computer to emulate a "dumb" terminal so that the computer can communicate remotely with a host system using the known communication protocol of a dedicated terminal. The host system often is unaware that a terminal emulator is communicating with it rather than an actual terminal. The host system simply sends and receives data consistent with the known communication protocol. The terminal emulator program interprets the commands from the host system and sends and receives information to and from the host system.

Of course, the same problems and limitations inherent in the character based and graphics based dedicated terminals, such as limited throughput and user unfriendliness, are also present in character based and graphic based terminal emulators.

To improve upon the user interface and to avoid many of the problems associated with the bottleneck of data throughput, some "terminal emulator" systems employ host specific dedicated terminal software programs. Such dedicated terminal programs reside on the remote computers and are executed by the remote computers to initiate and maintain communication with the host systems. Unlike standard character and graphics terminal emulators described above, terminal programs often have certain graphics as well as the text of many of the prompt screens already stored in the fixed storage device of the remote computer. For example, before connecting to a host system, the terminal program may display a log-on screen or a help screen to assist the user. The text of the log-on or help screen is accessible remotely to the terminal program without needing to communicate with the host system.

In addition, calculations and other executable functions may be performed by the dedicated terminal program on the remote computer. In this manner, the dedicated terminal programs convert the remote computer into a "smart" terminal, thereby relieving the host system from many of the tasks normally performed by the host system. The result is customized, user-friendly prompt screens, added features such as on-line help and other tools, and increased speed and efficiency of the entire system.

The dedicated terminal programs, however, also have certain drawbacks and deficiencies. By definition, these complicated software programs are not terminal emulators because they are not actually "emulating" any specific type of terminal. Instead, the terminal software program and host system communicate with each other using a unique protocol which both systems understand. The software programs are customized to the specific requirements of the host system and interact as an integral part of the host software. As a result, a major problem with dedicated software programs is that they are only compatible with the software of one specific host system. True terminal emulators use standard character or graphics communication protocols known to many host systems, and therefore, true terminal emulators are generic and may communicate with hundreds of host systems. Host specific dedicated terminal programs on the other hand are not flexible and only recognize and respond to very specific commands of one host system.

Moreover, since each command of the dedicated software program is specific to the host for which it was designed, a new terminal program must be written for each new host system. Developing hundreds or thousands of dedicated terminal programs for each different type of host system is unworkable. In addition to the time-consuming nature and expense of such an undertaking, many remote systems would not have sufficient data storage capacity to store the thousands of dedicated terminal programs required.

A second problem with dedicated terminal programs is that they are often large and complicated. Since a primary purpose of the dedicated terminal program is to off-load certain tasks and text handling responsibilities from the host system to the remote computer, the software programs usually require a substantial amount of disk storage space and are typically difficult to install and maintain on the remote computer.

A third problem with dedicated terminal programs is the difficulty in implementing dynamic changes to the host. With standard character or graphics terminals or emulators, changes to the host system do not require changes to the terminals or emulators themselves. However, with dedicated terminal programs, a change in the host system often requires substantial corresponding changes to the dedicated terminal program as well. For example, when the host system modifies or adds a new feature to a prompt screen, such as to the log-in screen or a help screen, then both the host system and the dedicated terminal program must be updated to accommodate the change. Updating the dedicated terminal program at each remote location is no minor task. Disks containing the updated version of the dedicated terminal program must be sent through the mail to each remote location or some other kind of sophisticated on-line patching of the dedicated terminal program must be performed.

SUMMARY OF THE INVENTION

In view of the foregoing, it is a primary object of the present invention to provide a fast, efficient remote communication system which provides user-friendly operation without the drawbacks and deficiencies of the prior art systems and devices.

A general object of the present invention is to provide a flexible remote communication system which can utilize the operating systems of remote computers to achieve user-friendly interfaces with the host system, such as those found in graphical or windowing environments.

Another general object of the present invention is to provide a remote communication system which is designed to be compatible with many independent host systems.

An additional object of the present invention is to provide a remote communication system which has a relatively small software interface program and does not require modification when the systems of the hosts are updated or modified.

The foregoing and other objects are, in the present invention, embodied in an improved remote communication system. This system is different from prior devices and methods that have large, complicated terminal dedicated programs which are incompatible the software of multiple host systems and which are difficult to maintain and update as the host systems are changed and updated. The remote communication system of the present invention provides a fast, efficient and user-friendly interface which does not suffer from the inefficiencies of the data transfer bottlenecks inherent in the prior art devices and methods.

In accordance with one aspect of the present invention, an operating system based remote communication system is achieved by providing a remote computer with a small, relatively simple terminal program which receives and interprets both data and command instructions from the host system. Rather than having a complicated dedicated terminal program to interpret and execute host specific commands, the emulator of the present invention employs commands which are based on fundamental tasks that the operating system of the remote terminal may understand and implement, such as creating windows, buttons, edit fields, listboxes and other operating system objects. In addition to sending, receiving and displaying data between the host system and the terminal, a function of the remote communication system of the present invention is to receive and interpret instructions from the host, instruct the operating system of the remote terminal to execute the instructions, and then report the successful completion of the instruction back to the host system.

Thus, the present invention discloses a remote communication system wherein user-friendliness is achieved by providing the user with a windowing or graphic interface with which the user is familiar; speed and throughput is increased by relieving the host system from the burden of displaying and maintaining the user interface; and portability and flexibility is achieved by employing commands tailored to the features of the operating system of the remote terminal computers, not host specific commands.

An advantage to the present invention includes the ability to maintain the beneficial characteristics of character based emulators, graphics based emulators, and dedicated terminal program "emulators" while alleviating many of the problems inherent in each of the systems.

Other objects and advantages of the present invention will become apparent from the following detailed description when taken in conjunction with the drawings, in which:

BRIEF DESCRIPTION OF THE DRAWINGS

FIGS. 3B–3D list fundamental core commands used by the remote communication and host systems of FIG. 1 as well as their parameters and a short description.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
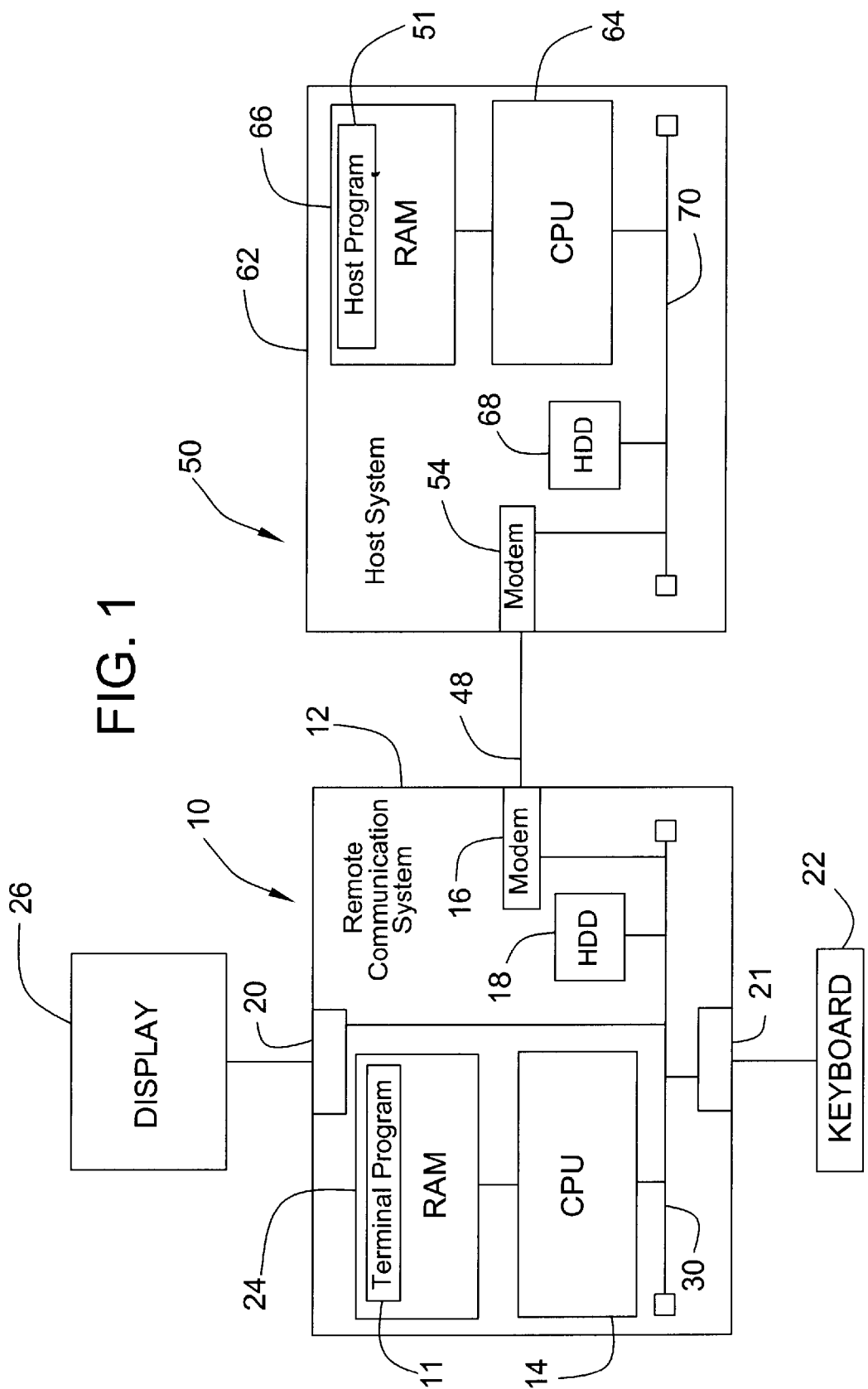
FIG. 1 is a schematic diagram of a preferred embodiment of the present invention—a remote communication system—showing the arrangement of some of its major elements.

Referring to FIG. 1, there is shown a block diagram of a preferred embodiment of the present invention in the form of a remote communication system 10. The remote communication system 10 consists generally of a personal computer 12 having a microprocessor (CPU) 14 and other compatible peripherals including a modem 16, a hard disk drive (HDD) 18, a video graphics card 20, a serial keyboard port 21, a keyboard 22 and a display monitor 26. Communication between the microprocessor 14 and the peripherals is achieved through a communication bus 30.

The microprocessor 14 may be an Intel 80486 and the computer 12 is preferably running the Microsoft® Windows™ operating system and has 8 Megabytes of random access memory (RAM) 24. While certain elements used in the illustrative embodiment of the present invention are specifically identified herein, many variations and substitutions, known to those skilled in the art, can be employed without deviating from the intended scope of the present invention.

Typically, the remote communication system 10 operates and may be used as follows. A user—using the remote communication system as a terminal—directs the remote communication system 10 to initiate communication with a host system 50 by entering commands through the keyboard 22. A terminal emulator program 11 stored in the RAM 24 controls the operation of the remote communication system 10 and the transmission and receipt of data to and from the host system 50. Log-in and other information is modulated by the modem 16 of the remote communication system 10 and is sent to the host system 50 via telephone lines 48. A modem 54 connected to the host system 50 demodulates the received information. Alternatively, an Integrated Service Digital Network (ISDN) or other communications means, such as a digital phone line, for example, may be employed in lieu of the modems for communication between the host system and the terminal.

In the preferred embodiment, the host system 50 consists generally of a 80486-66 Mz Gateway 2000 computer 62 having a microprocessor (CPU) 64 and other compatible peripherals including a hard disk drive (HDD) 68. Communication between the microprocessor 64 and the peripherals is achieved through a communication bus 70.

Figure 2:
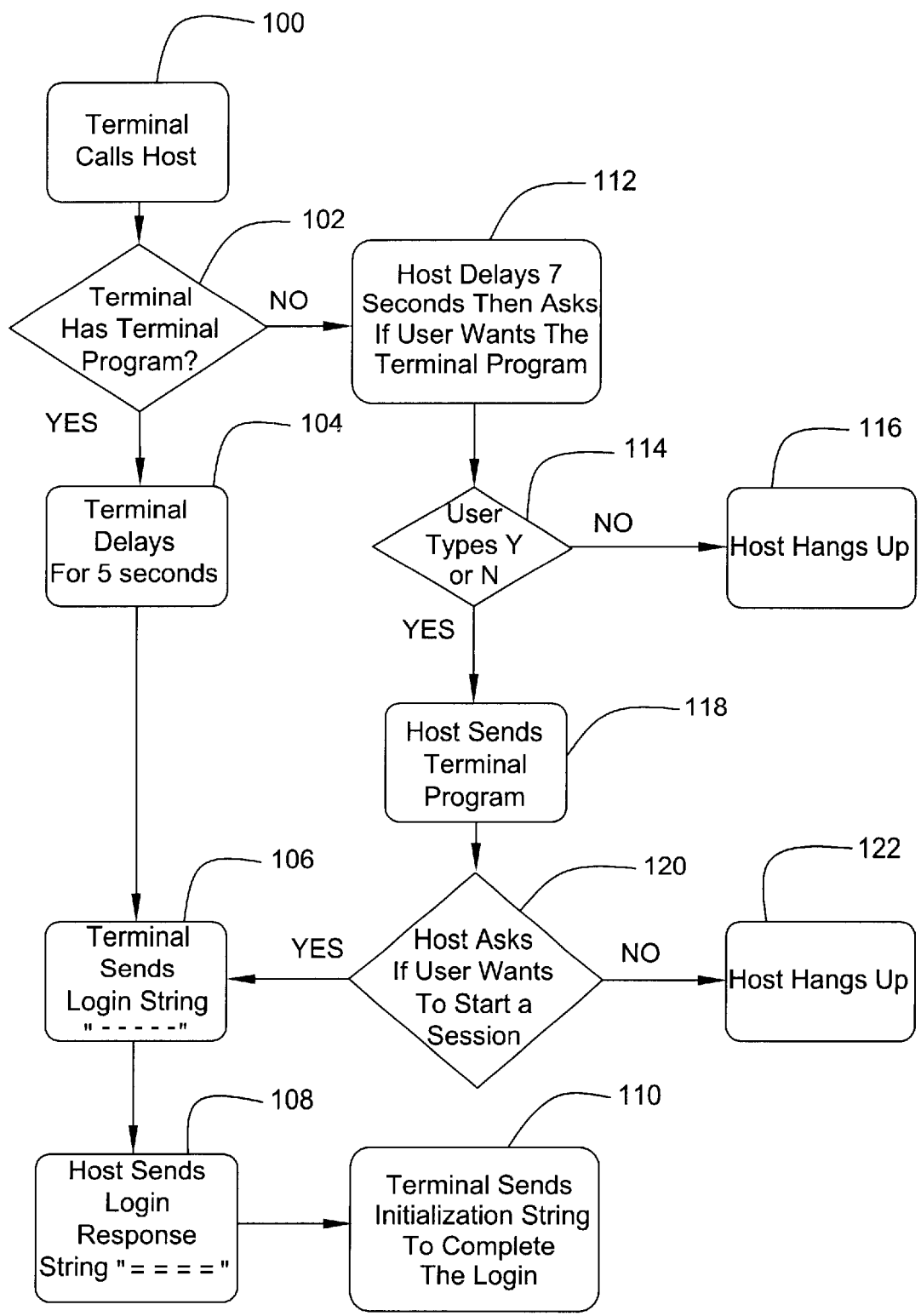
FIG. 2 is a flow chart representation of a preferred sequence of operations followed by the remote communication and the host systems of FIG. 1 to initiate remote communications and start a terminal session.

As shown in FIG. 2, the remote communication system calls the host system 50 at step 100. If the remote communication system 10 has a copy of the terminal program 11, then the remote communication system 10 waits 5 seconds for the host system 50 to answer (step 104) and sends the host system a login string "~~~~" (step 106). The host system 50 acknowledges receipt of the login string by sending login response string "====" (step 108). At step 110, the remote communication system 10 sends the host system 50 an initialization string comprising information about the remote computer 12, such as the type of operating system, processor and display being used and whether the remote computer 12 has a mouse. At this point, communication has been established and the host system 50 can begin to send commands or other instructions or data to the remote communication system 10 as described in more detail below.

Conversely, if the remote computer 12 does not have the terminal program 11, the host system 50 after waiting 7 seconds without receiving the login character string "~~~~" from the remote computer 12, sends an ASCII text prompt asking if the user would like to download the terminal program 11 (step 112). If the user answers "no", then the host system 50 simply hangs up (step 116). However, if the user answers "yes", then the host system 50 sends the terminal program 11 to the remote computer 12 using an industry standard file transfer protocol, such as xmodem (step 118), and asks if the user would like to start a terminal session (step 120). If the user answers "no", the host system 50 again simply hangs up (step 122). If the user answers "yes", then the remote computer 12 executes the terminal program 11 while maintaining the connection to the host system 50 and begins the terminal session as described above by sending the host system 50 the login string "~~~~" (step 106).

After the login process is completed, the host system 50 sends commands or other instructions to the remote communication system 10 depending upon the requirements of the host system 50. As is well known in the art, the host system 50 has a host program 51 which is stored in the RAM 66 of the host system 50 and which perform one or more of a limitless number of services. For example, the host system may provide bulletin board services, database or other informational services, or more advanced project specific services. of course, the host program 51 may be written in any known programming language compatible with the operating system of the host system 50.

As commands are received from the host system 50, the terminal emulator program 11 interprets the commands and passes them onto the operating system of the remote communication system 10 for execution.

Figure 3A:
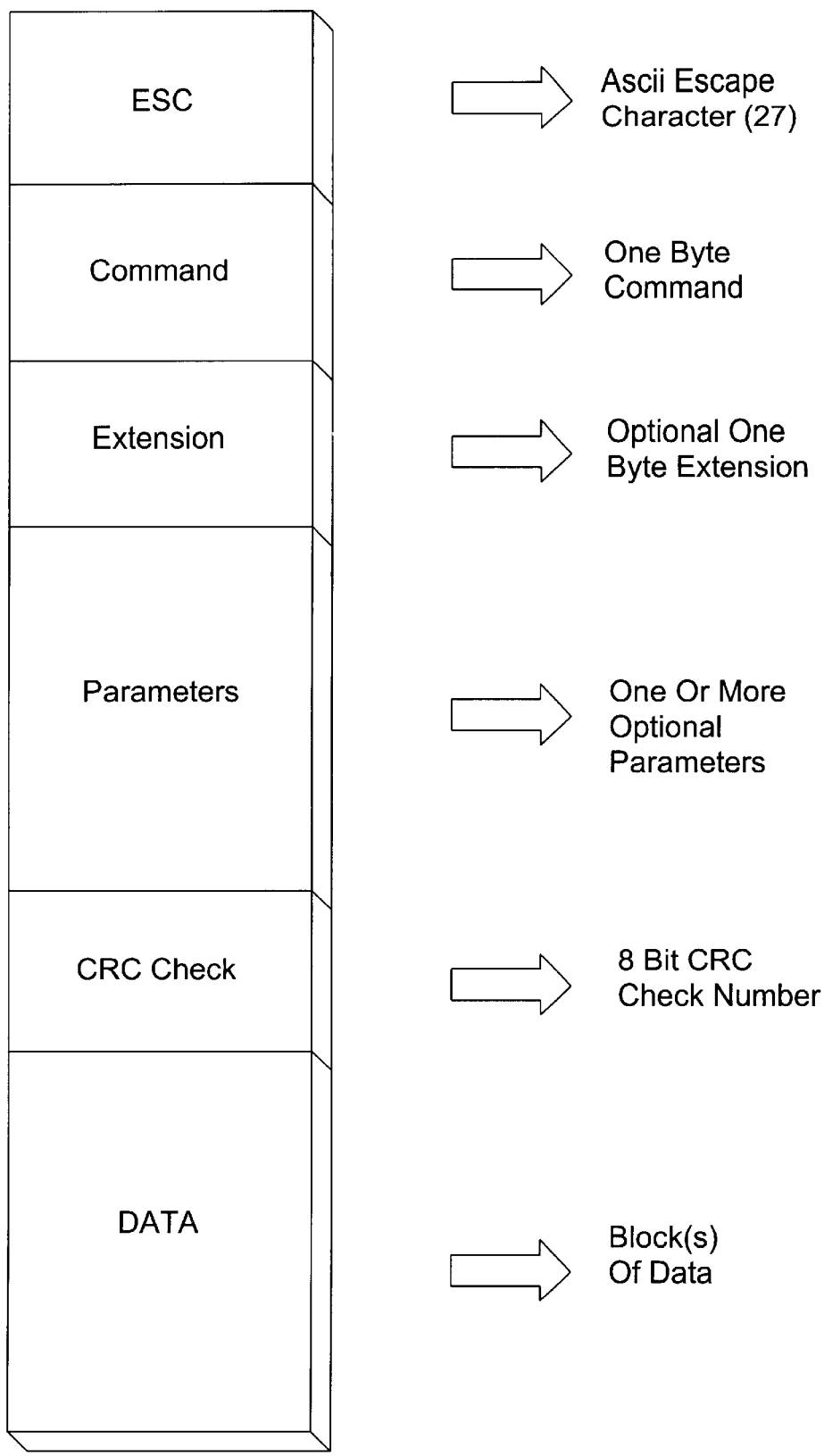
FIG. 3A shows the general data structure format of commands sent between the remote communication and host systems of FIG. 1.

FIG. 3A shows the general data structure format of commands sent between the host system 50 and the remote communication system 10. In the preferred embodiment, an escape character (27) which is one byte long precedes every command. After the escape character, a one or two byte command set follows. The first byte of the command set is the command itself. The next byte is an optional extension for the command. After the command set, parameters of the command, if any, follow. An 8 bit cyclical redundancy check (CRC) number follows the parameters to ensure that the command and parameters have been transmitted and received properly. If a command contains no extensions or parameters, a CRC check follows the command without any gaps or null spaces. In some instances, parameters of a command may include data of a variable length. In such cases, the variable length data follows the CRC check. A list of fundamental core commands used in the preferred embodiment of the present invention as well as their parameters and a short description is shown in the tables of FIGS. 3B–3D.

Certain commands directed to controlling graphics do not follow the general command format. Instead, graphics commands such as "Select Brush", "Select Pen", "Draw Circle" and "Draw Metafile" do not contain the lead escape character (27). Since such graphics commands are often sent together in sets of commands (e.g. to control the display 26 of the remote communication system 10), it is more efficient to identify a set of these commands with a special escape sequence—in this case "<ESC><B>". After receiving the special escape sequence, the subsequent flow of commands are interpreted by the remote communication system 10 to be graphics commands until an escape character (27) ends the flow.

In the preferred embodiment of the present invention, the remote communication system 10 uses dialog resources to aid in the creation of windows, buttons, edit fields, listboxes and other operating system objects. A dialog resource is a file which contains the parameters defining the operating system object, including parameters defining how the object looks and operates. For example, each window in a Microsoft® Windows™ program contains various objects. The objects that sit on top of the window, such as buttons, edit fields, listboxes and scroll bars, are called controls. Dialog resource files created by programmers or users store information parameters for the controls. The remote communication system 10 uses the information contained in the dialog resource to instruct the operating system to create and maintain the operating system objects defined thereby.

Dialog resources are sent to the remote communication system 10 by the host system 50 as needed. As shown in FIG. 3B, the command used by the host system 50 to create a dialog resource is a "W" having a "C" extension. As parameters, the host system 50 sends the remote communication system 10 the dialog number, the dialog parent number, the dialog ID, and the dialog version. The dialog number identifies which dialog resource is to be displayed. The dialog parent number is the number of the dialog window's parent. If there is no parent of the dialog window, the parent number equals 255. The dialog ID is the encoded resource file name which contains the dialog window template and the dialog version contains the version number of the dialog resource to be displayed.

Figure 4:
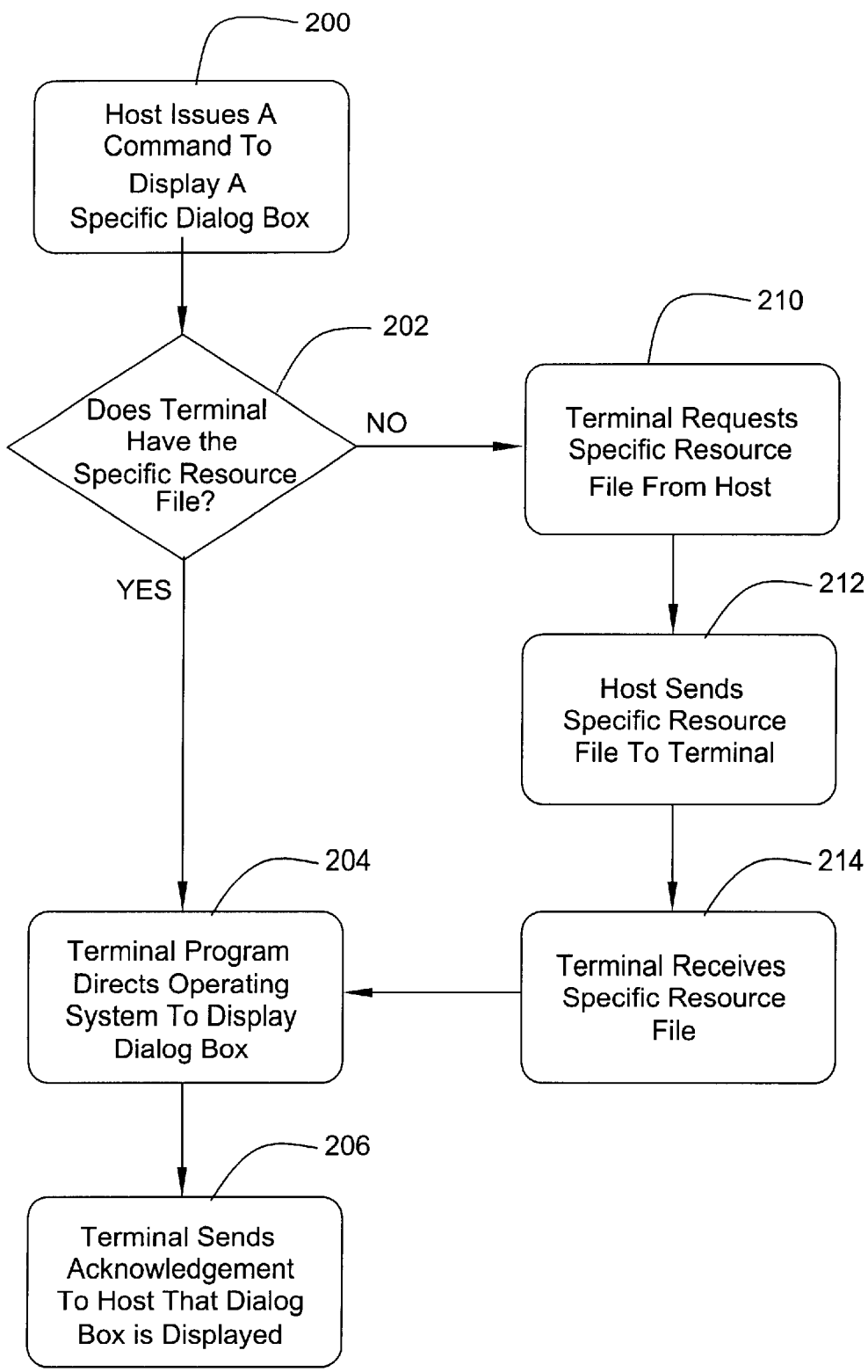
FIG. 4 is a flow chart representation of a preferred sequence of operations followed by the remote communication and host systems of FIG. 1 to create dialog boxes on the remote computer.

The protocol of the remote communication system 10 provides for the automatic transfer of files containing a dialog resource from the host system 50 in the event that the remote communication system 10 does not have the dialog resource. FIG. 4 is a flow chart representation of a preferred sequence of operations followed by remote communication system 10 and the host system 50 to send dialog resource files to the remote communication system 10 and to display the resulting dialog boxes on the display 26. When the host system 50 directs the remote communication system 10 to display a window, the host system 50 at step 200 transmits through its modem 54 a number identifier for the window, as well as a version number of the window. The remote communication system 10 then checks to see if it has the dialog resource file associated with the requested window on its hard disk drive 18 (step 202). If so, the remote communication system 10 creates and displays the window on the screen of the display 26 (step 204) using information retrieved from the resource file and acknowledges the creation of the window to the host system 50 (step 206).

If the remote communication system 10 does not have the identified dialog resource file, the remote communication system 10 adds the dialog resource file to an internal list of requested resources and makes a request for the dialog resource file from the host system 50 (step 210). Upon receipt of the request for the dialog resource file, the host system 50 transfers the resource file to the remote communication system 10 (step 212). At step 214, the remote communication system 10 receives and stores the dialog resource file and removes the dialog resource file from the list of requested resources. Then, the remote communication system 10 creates and displays the window on the screen of the display 26 (step 204) and acknowledges the creation of the window to the host system 50 (step 206). The format of the message acknowledging the successful creation of the dialog box is shown in FIG. 3D.

By using dialog resources to create windows, the amount of time it takes the remote communication system 10 to display and maintain the window is dramatically reduced. Since the remote communication system 10 knows how to display and maintain windows, only a small amount of information about the window needs to be transmitted to the remote communication system 10 as explained above.

The process of creating the software of the host system 50 is also greatly simplified. To display a window on the remote terminal display 26, the host system 50 simply sends the command to display the desired window. If the remote communication system 10 has the resource file for the window, the window is displayed. If not, the host system will receive a request for the resource file to which it can easily respond. In this manner, windows and other operating system objects may be displayed and maintained on the screen of the terminal display 26 by the operating system. Alternately, if the operating system of the remote computer 12 is of the type that does not support such operating system objects, such as MS-DOS®, commands related to the operating system objects are executed by the terminal program 11.

In any event, the host system 50 is notified when the user activates any objects (such as a button in a window) on the screen of the terminal display 26, and if necessary, the host system 50 sends the remote communication system 10 further instructions and information. For example, the format of the message notifying the host system 50 that a button has been activated is shown in FIG. 3D, line 2.

Of course, resource files can be used to do more than simply creating and displaying dialog windows. In the present invention, resources are also used to aid in the transmission and deliver of graphics, video, audio, lists and other text that are repeated frequently. In addition, resources containing software code which can be executed by the remote communication system 10, e.g. dynamically linked libraries (DLLs), are available. By sending resources containing executable code to the remote communication system 10, many time consuming tasks are off-loaded for the remote communication system to perform, thereby relieving a potential bottleneck of the host system 50.

For example, a database maintained by the remote communication system 10 can be searched locally rather than expending the time necessary to send the potentially lengthy database to the host system 50. In addition, executable code resources are particularly useful in off-loading data or display intensive tasks to the remote communication system 10 such as those involving the generation of reports or the display and manipulation of graphics.

In the case of DLL code resource files, an initialization file (.INI) is maintained by the host system 50 containing: 1) the DLL version number, and 2) a function prototype with a return type and a list of parameters required by each function. The parameter list includes information regarding the size and make-up of the messages sent to and returned by the DLL when it is running on the remote communication system 10.

When the host system 50 wants to execute the functions of a DLL on the remote communication system 10, the host system 50 sends DLL version number and the function to be executed by the DLL, as well as the parameters to be used by the DLL. After executing the desired function, the DLL sends the host system 50 a return value, if a return value was required by the function prototype of the .INI file.

Since DLLs described above are actually executing on the remote computer 12, the code contained in a DLL must be remote computer specific. Accordingly, in an alternative embodiment of the present invention, executable code resources are sent to the remote computer 12 in a standardized scripted language which is independent of the operating system of the remote computer 12. An interpreter is then used by the remote computer 12 to interpret the executable code resources sent by the host system 50. After decoding the scripted instructions, the interpreter executes the commands that were required by the executable code resources. Alternatively, the incompatible code itself could be translated by the remote computer 12 and then executed.

By transmitting and using executable code resources in the manner described above, a tremendous amount of customizing and extremely powerful user interfaces may be achieved.

Figure 5:
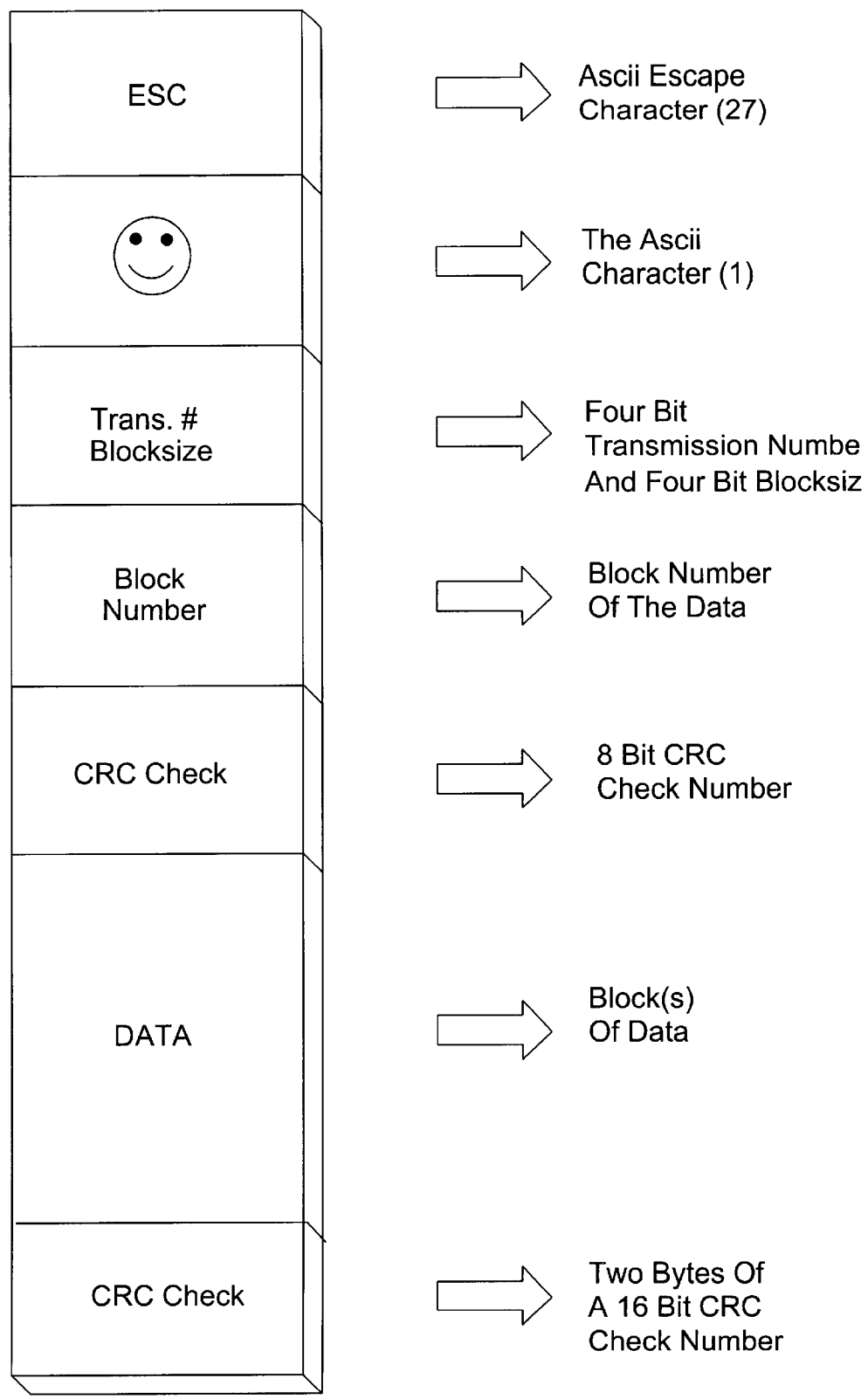
FIG. 5 is a diagram showing the data structure and file transfer protocol used to transmit resources and other files to the remote communication system of FIG. 1.

Referring to FIG. 5, there is shown the data structure and file transfer protocol used to transmit resource and other files to and from the remote communication system 10. In the case of a file transfer to the remote communication system 10, as with every command, an escape character (27) proceeds the command. After the escape character, the ASCII character 1 indicates the beginning of a block. The next byte contains the transmission number of the file (4 bits) and the blocksize (4 bits) of the block of data to be transmitted. The next byte represents the block number contained in the message, and the following byte represents the CRC number which is used to ensure that the preceding four bytes are transmitted and received properly. Data for the block is provided after the CRC number. By decoding the blocksize, the remote communication system 10 knows the amount of data contained in the message. In the preferred embodiment, the amount of data equals 2 to the power of blocksize, which gives it a range from 1 byte to 32 K bytes. A 16 bit CRC number follows the data to ensure that the data has been transmitted and received properly.

To begin the transfer of a resource or other data file, the host system 50 sends a command to begin a file transfer conversation by transmitting an escape character, followed by the character 1, the transmission number and a zero block number to the remote communication system 10. In lieu of actual file data, the data section following a zero block number contains the following information:

1) FILE NAME—string of up to 13 characters
2) FILE LENGTH—string of characters "0" to "9"
3) FILE TYPE—1 character
    "R" for resource file
    "F" for other file
4) FILE DATE—string of characters "0" to "9"
5) FILE TIME—string of characters "0" to "9"

Each of the above items are separated by NULL (0) characters and the remainder of the data section is padded with NULL characters to fill the blocksize. After receiving a zero block command, the remote communication system 10 opens the file in the hard disk drive 18 under the FILE NAME provided, and registers an active file transmission in an active file table. A three byte extension to the FILE NAME defines the type of the resource:

".DRC" represents a dialog resource
".WMF" represents a meta graphics file
".BMP" represents a device independent bitmap graphics file
".TXT" represents an ASCII text file
".LST" represents a ASCII list file For each new data block that is transmitted and received, the remote communication system 10 performs a CRC check on the data and compares the results with the CRC number transmitted. If the CRC number of the block matches the calculated CRC number, then the file is updated by adding the new data to the end of the file and by updating the size of the file. If the size of the file matches the FILE SIZE, then the transfer is completed and the file is closed. If there is still more data which needs to be transmitted, the file remains open and a file transfer record is maintained and updated.

After successfully receiving a block of data, the remote communication system 10 sends a positive acknowledgement (ACK) to the host system 50. If there was an error in transmission, then the remote communication system 10 sends a negative acknowledgement (NAK).

Figure 6:
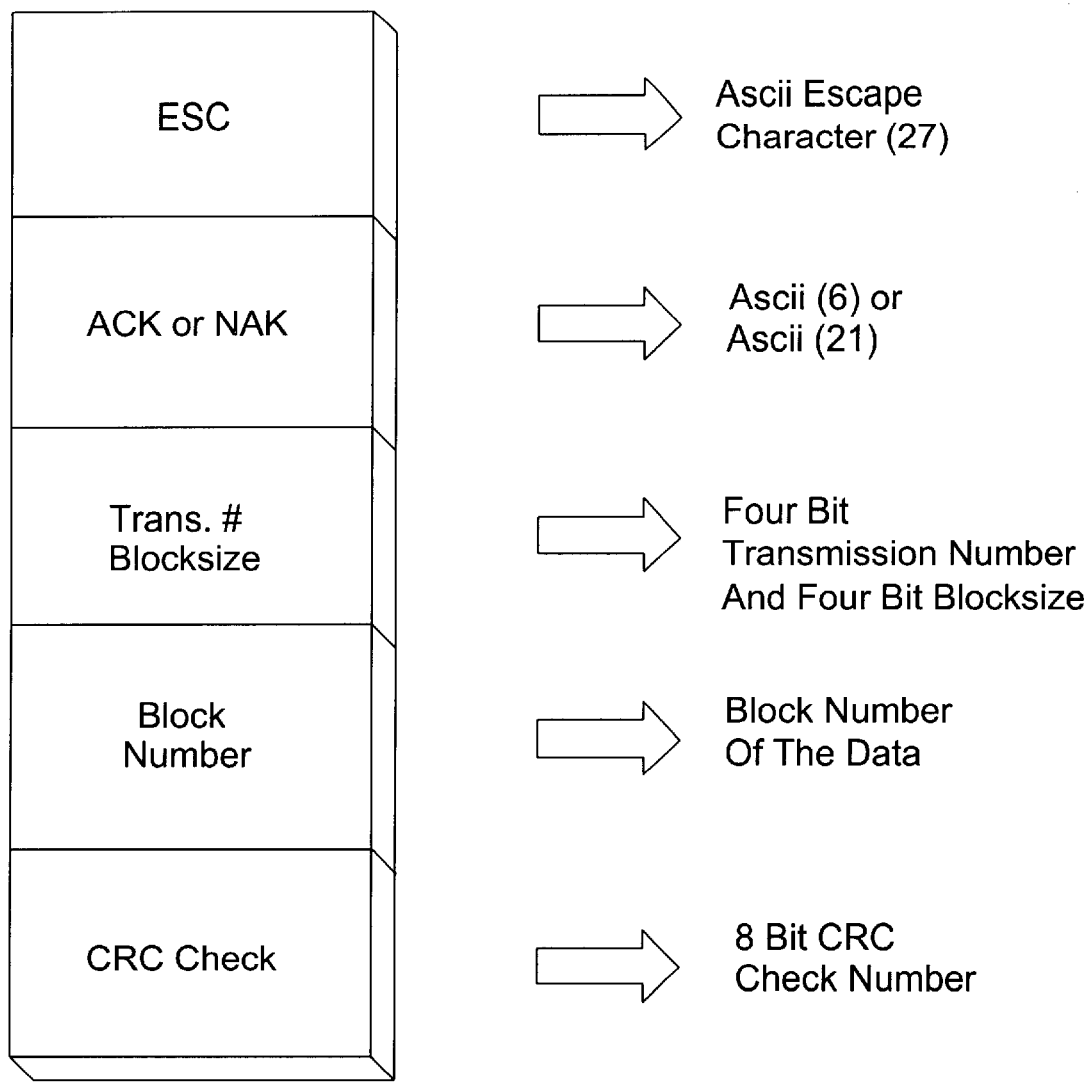
FIG. 6 is a diagram showing the data structure for a positive acknowledgement (ACK) and a negative acknowledgement (NAK).

Referring to FIG. 6, there is shown the data structure for both the positive and negative acknowledgements. Again, an escape character (27) one byte long proceeds every command, including ACK and NAK commands. After the escape character, an ACK (6) or NAK (21) character is present. An ACK character indicates the successful transmission of a block and a NAK character indicates the unsuccessful transmission of a block. The next byte contains the transmission number of the file (4 bits) and the blocksize value (4 bits) of the block of data which was transmitted. The next byte represents the block number which was transmitted, and the last byte represents the cyclical redundancy check (CRC) number which is used to ensure that the preceding four bytes are transmitted and received properly.

The transmission number is provided in the acknowledgements and maintained by the remote communication system 10 and the host system 50 because, as described below, the host 50 may be expecting ACK's from multiple file transfers. The block number is provided so that the host system 50 does not need to wait for the acknowledgement of earlier transmitted blocks before beginning to transfer the next block.

To ensure the proper operation and completion of a file transfer, the host system 50 maintains a list of unacknowledged blocks. If an ACK is received, the host system 50 simply removes the block from the list of unacknowledged blocks. However, if a NAK is received by the host system 50, the block is resent and remains on the list of unacknowledged blocks. To ensure the eventual delivery of blocks, a timer is set when a block is transmitted. If the timer expires without receiving an ACK or a NAK, the block is resent.

In accordance with an important aspect of the present invention, commands and requests can be sent to and from the remote communication system 10 between the blocks of a file transfer. This allows the user to continue to access the features of the host system while one or more file transfers occur in the background. If a resource or other file is requested to be transmitted before all the blocks of the current file transfer have been transmitted, the transmission number allows the remote communication system 10 and the host system 50 to keep track of the files to be transferred, thereby allowing multiple blocks of multiple files to be transmitted concurrently.

In accordance with another important aspect of the present invention, blocks of data which are transmitted after an error is detected with a preceding block are buffered and stored in the RAM 24 of the remote communication system 10. After the retransmission of the block containing the error, the buffered blocks are combined with the retransmitted block and are added to the appropriate location within the file. In this manner, the retransmission of properly transmitted blocks is held to a minimum. As a precaution, a window feature limits the amount of data that can be sent after an error is detected. If the number of unacknowledged blocks exceeds the preset limit (e.g. 4 blocks), then the host system 50 stops sending new blocks.

On occasion, particularly with long file transfers, an error in the phone lines or some other error may occur which causes the remote communication system 10 or the host system 50 to abort the file transfer. In such a case, a portion of the aborted file may have been properly received and stored on the hard disk drive 18 of the remote communication system 10.

Figure 7:
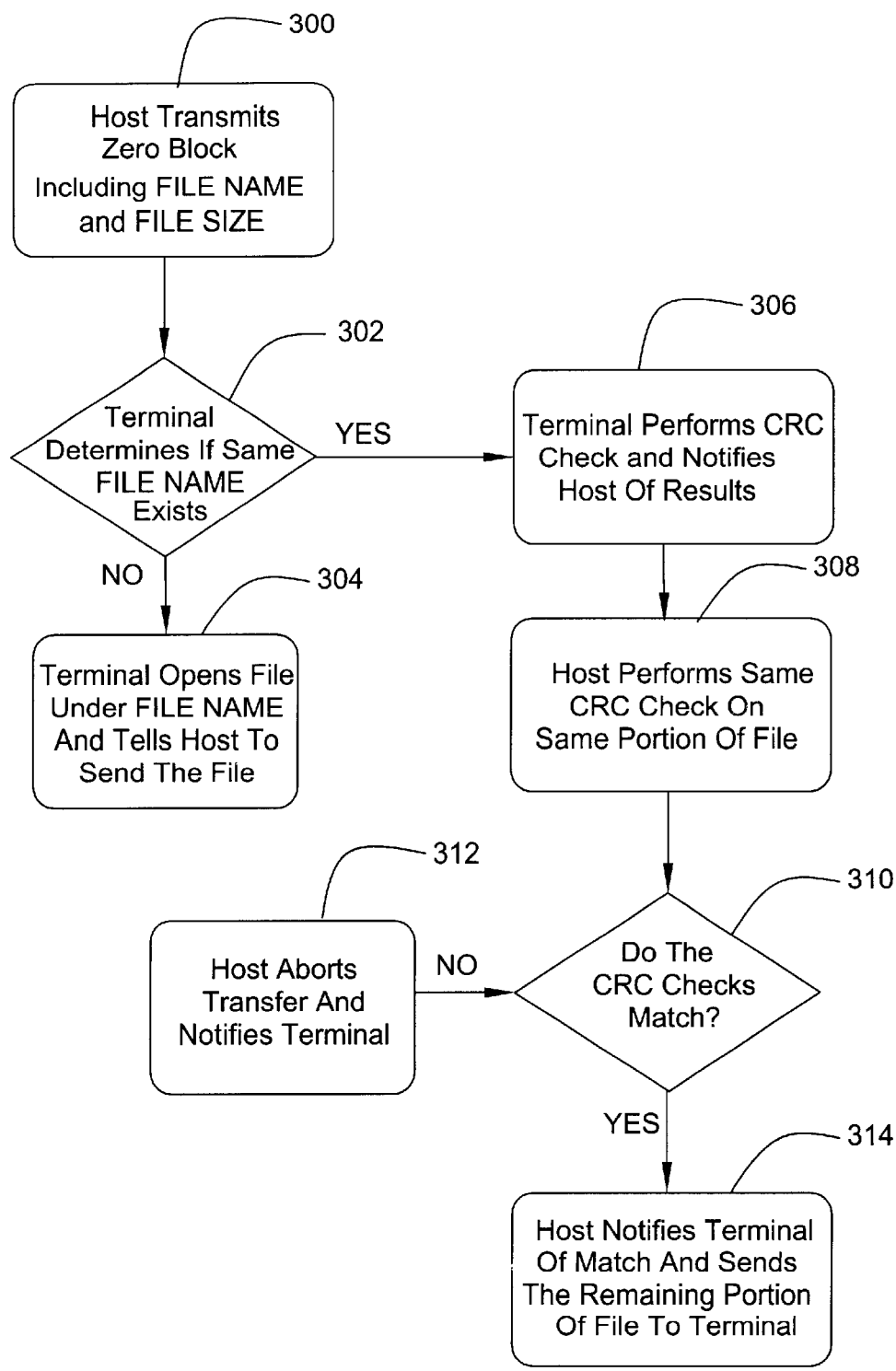
FIG. 7 is a flow chart representation of a preferred sequence of operations followed by the remote communication and host systems of FIG. 1 to transmit files to the remote computer.

Accordingly, as shown in FIG. 7, upon receiving a zero block command (step 300), the remote communication system 10 first checks the hard disk drive 18 to determine if a file with the same name as FILE NAME exists having a smaller size than FILE SIZE (step 302). If such a file does not exist, then the remote communication system 10 simply opens a file under the file name FILE NAME and advises the host system 50 to send the file (step 304). At step 306, the host system 50 completes the file transfer by transmitting the file to the remote communication system (step 306).

If a file with the same name as FILE NAME already exists on the hard disk drive 18, the remote communication system 10 performs a CRC check on the existing file and sends a notification to the host system 50, including the transmission number, the length of the existing file, and the CRC number (step 306). The host system 50 then performs the same CRC check on that portion of the file to be transferred identified by the length of the existing file (step 308) and determines whether the CRC checks match (step 310). If not, the host system 50 aborts the transmission and notifies the remote communication system 10 that no match occurred (step 312). If the CRC checks match, then the host system 50 notifies the remote communication system 10 of the match and then sends the remote communication system 10 only those additional data blocks that the existing file does not have (step 314). The remote communication system 10 then combines the additional data blocks with the previously existing blocks of data to form the entire file.

As can be appreciated by those skilled in the art, file transfers from the remote communication system 10 to the host system 50 may also occur concurrently and are implemented in the same manner as described above.

The remote communication system 10 of the present invention has the capacity to display listboxes. A listbox is essentially a control which allows a user to view a list of items by displaying a limited number of items within a window and by allowing the user to scroll through the list to view any remaining items if so desired. Listboxes are particularly useful in helping to display large lists of items. For example, a listbox may display a list of employees or a list of documents stored in a directory. To display a listbox, a program generally needs to maintain the list of strings comprising the list. The operating system handles the data manipulation and display of the lists on the screen within the window of the terminal display 26.

For short lists (e.g. smaller than 30 items), the host system 50 can simply maintain the listbox by issuing multiple commands to insert lines into the listbox as necessary. To reduce the number of commands, the host system 50 may simply transmit the entire list of items to the remote communication system 10. The list of items is then maintained and displayed using the operating system of the remote computer 12. However, to avoid having to transmit or maintain large lists of perhaps thousands of items or more, an alternate method of updating the listboxes is provided by the remote communication system 10 of the present invention.

Figure 8:
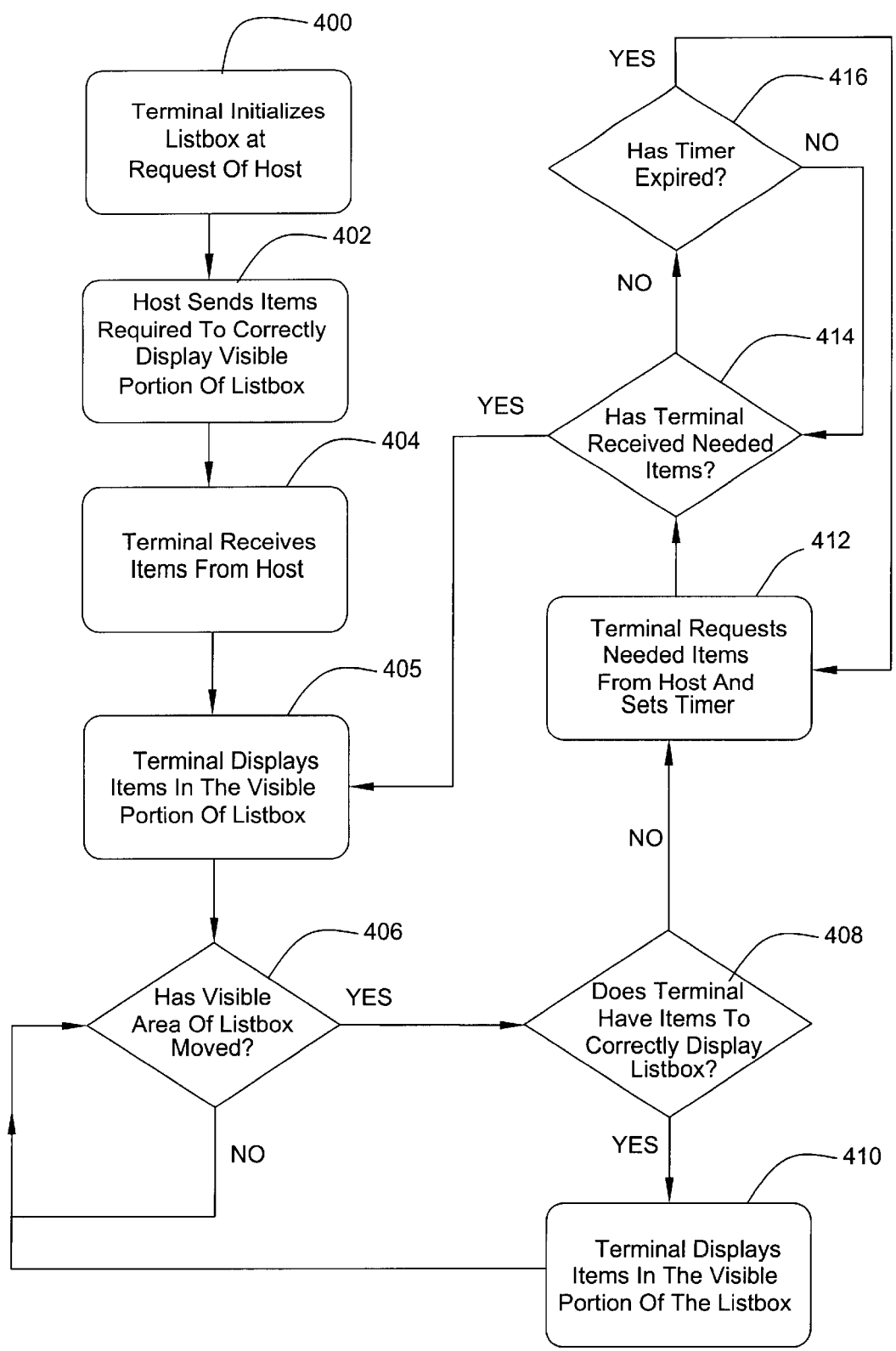
FIG. 8 is a flow chart representation of a preferred sequence of operations followed by the remote communication and host systems of FIG. 1 to display and maintain listboxes on the remote computer.

This alternate method of updating larger listboxes takes advantage of the fact that users seldom look at every item contained in a listbox. Referring generally to FIG. 8, to initialize a listbox the host system 50 sends an initialization string to the remote communication system 10 (step 400). The initialization string includes the number of items contained in the listbox. Immediately after the initialization string is sent, the host system 50 sends enough items of the list to correctly display the visible portion listbox (step 402). The remote communication system 10 receives the items (step 404) and displays the items in the visible portion of the listbox (step 405).

Whenever the viewable area of the listbox moves, the operating system notifies the terminal program 11 which determines if any blank spaces are visible in the viewable area (step 406). If so, the terminal program 11 checks to see if the remote communication system 10 has the items required to correctly display the listbox (step 408). If so, the remote communication system 10 simply displays the required items (step 410). If the remote communication system 10 does not have the items required to correctly display the listbox, then it marks any needed items and sends a request to the host system 50 to supply the items (step 412).

To minimize the problems associated with faulty telephone line connections, the remote communication system 10 also sets a timer when a request for a listbox item is made (step 412). At step 414, the remote communication system 10 determines if it has received the needed items. If so, the terminal simply displays the items in the visible portion of the listbox (step 405). If not, the terminal checks to see if the timer has expired (step 406). If the timer has expired, the remote communication system 10 checks for any needed items and checks the listbox for blank spaces in the current visible portion of the listbox. At this point, retransmission of the listbox items is requested by the remote communication system 10, if necessary (step 412).

In order to eliminate multiple requests for the same items, the remote communication system 10 maintains items received from the host system 50. The remote communication system 10 also limits the request for information from the host system 50 to the number of items that would correctly display the listbox at any point in time, thereby reducing the amount of data that needs to be transmitted by the host system 50 when the user is simply scanning quickly over the list of items. In this manner, multiple requests for unwanted data do not backlog the data transfer capabilities of the system.

In an alternate embodiment of the present invention, the host program 51 is written in a script language. The script language provides a set of commands which are compatible with and recognizable by the terminal emulator program 11. For example, the script language contains commands for creating and destroying dialog and message boxes and for responding to miscellaneous messages from the remote communication system 10 such as those related to button activity and updating edit fields. The script language can then be compiled by a script compiler to create either an executable host program or a host program which can be interpreted by an interpreter.

Writing the host program 51 in a script language facilitates the development and maintenance of multiple host systems. The script language provides a simple platform for creating host programs which can interface with the remote communication system while alleviating the need for each designer of a host system to develop and maintain mundane and repetitive code which is applicable to all host systems, such as code for communications protocol and the like.

As can be seen from the foregoing detailed description, the present invention discloses an improved remote communication system which provides a powerful, user-friendly interface in a windowing or graphic environment without sacrificing either speed or portability of the system.

What is claimed is:

1. A remote communication system on a terminal for communicating with a physically remote host system of the type which runs a host program and which provides services to one or more users of the remote communication system on the terminal and wherein the operating systems of the host and remote terminal are not necessarily the same, the remote communication system comprising:

a central processing unit;

a graphical interface operating system;

means for receiving commands and data sent by the physically remote host system, the received commands comprising operating system independent instructions for manipulating graphic interface operating system objects;

a terminal program running on said remote communication system, said terminal program including means for interpreting the received operating system-independent instructions and executing graphic interface operating system instructions corresponding to the interpreted operating system-independent instructions; and a display operatively connected to said central processing unit for displaying the results of the commands executed by the graphical interface operating system.

2. The remote communication system of claim 1 wherein the received commands are sent by the physically remote host system in the form of resource files maintained by the physically remote host system.

3. The remote communication system of claim 2 further comprising a hard disk device suitable for storing said resource files.

4. The remote communication system of claim 3 wherein the graphical interface operating system objects include dialog boxes, windows, listboxes and edit fields.

5. The remote communication system of claim 3 wherein the graphical interface operating system objects comprise a button and the terminal program reports the triggering of the button to the physically remote host system.

6. The remote communication system of claim 3 wherein said resource files are stored on the hard disk drive of the remote communication system after being received for later retrieval and said resource files are only transmitted by the physically remote host system if the resource files are not available on said hard disk drive.

7. The remote communication system of claim 1 wherein the remote communication system further comprises a random access memory suitable for storing the terminal program, the graphical interface operating system and said commands received from the physically remote host system.

8. The remote communication system of claim 1 wherein the terminal program reports the successful completion of a command to the Physically remote host system.

9. The remote communication system of claim 1 wherein the host program is written using a script language.

10. The remote communication system of claim 1 wherein the terminal program is transmitted to the remote communication system if the physically remote host system determines that the terminal program is unavailable.

11. The remote communication system of claim 1 wherein the receiving means comprises a modem.

* * * * *